Dec. 30, 1930.    R. B. HAINSWORTH    1,787,070
GEAR PULLER
Filed April 15, 1927
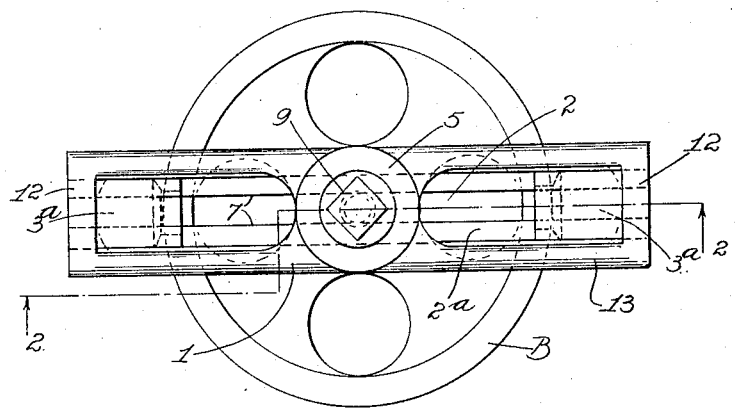
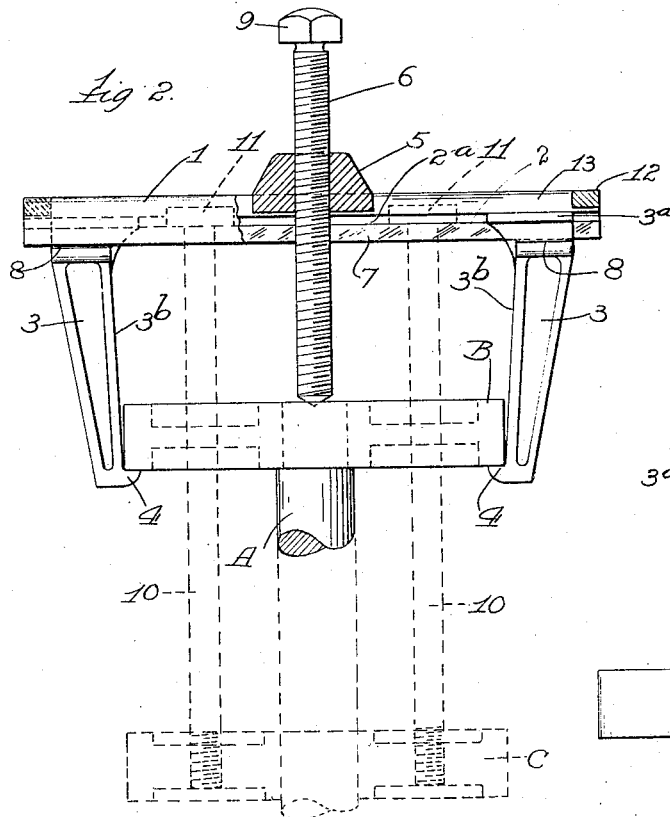
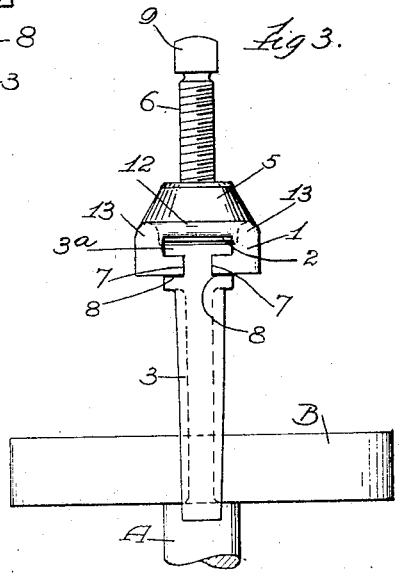
Inventor:
Robert B. Hainsworth.
by [signature]
his Attorneys.
Witness
[signature]

Patented Dec. 30, 1930

1,787,070

UNITED STATES PATENT OFFICE

ROBERT B. HAINSWORTH, OF MAYWOOD, ILLINOIS

GEAR PULLER

Application filed April 15, 1927. Serial No. 183,974.

The purpose of this invention is to provide a simple and convenient device for removing gears or other elements from shafts on which they are secured by a forced or driving fit. It consists in certain features and elements of construction in combination, as herein shown and described, and as indicated by the claims.

In the drawings:—

Figure 1 is a face or plan view of a gear pulley embodying this invention, showing it in the position of use as applied for removing a wheel from a shaft.

Figure 2 is a side elevation of the same taken partly in section, as indicated by line, 2—2, on Figure 1.

Figure 3 is an end elevation of the device.

A tool of this character is preferably adapted for use with a considerable range of sizes of gears or wheels; for that reason the cross-bar, 1, is of a length corresponding to the maximum size of wheel for which the tool is intended, and is formed with an under-cut slot or groove, 2, extending throughout its length. The jaw members, 3, 3, whose hooked end portions, 4, are designed to engage the gear or wheel to be removed, are formed with base portions which fit slidably in the slot, 2, of the cross-bar, so that they may be readily adjusted to any position in the length of the bar.

At the middle of its length the bar, 1, is formed with a boss, 5, having a central threaded aperture for the jackscrew, 6, which is designed to exert sufficient pressure against the end of the shaft, A, to force the shaft out of the hub of the part, B, which is shown simply as a wheel, but which may be a gear wheel, or even a non-circular part fitted tightly to the shaft, A.

As shown, the oppositely facing ribs, 7, which form the sides of the slot, 2, engage in grooves, 8, in opposite sides of the base portions of the jaw members, 3. These grooves fit the ribs, 7, with just enough clearance for easy sliding; but any pressure against the hooked parts, 4, tends to tip the bases with respect to the guide ribs, 7, and to the full extent permitted by the clearance between the grooves, 8, and the ribs, 7. This slight tipping or cramping of the jaw members, 3, produces a strong frictional engagement of their grooved bases with the cross-bar, 1, holding them at any position of adjustment at which the pressure is applied to the hooked ends, 4. Thus, when the tool is placed in the position of use by centering its jackscrew, 6, over the end of a shaft member, such as the shaft, A, shown in the drawing, it is only necessary to insert the jaw members, 3, 3, in the ends of the slot, 2, and push them against the periphery of the wheel, B, to bring them to the position of use. Then by adjusting the jackscrew, 6, until the hooked end portions, 4, take hold against the wheel, B, the tool is applied firmly enough to hold its position alone, and by the application of a wrench to the square head, 9, of the jackscrew, the shaft, A, may be forced out of the hub of the wheel, B.

In some cases, the periphery of a wheel member is unsuited to the application of the gear puller jaws, 3, 3, as for example in composite fiber gears or fiber-faced friction pulleys. Such wheels generally have threaded openings in the metal web between the hub and rim, so that bolts or screws may be inserted in these openings in place of the jaws, 3, 3. Figure 2 indicates such a situation in dotted lines in which the threaded bolts, 10, are engaged with the web of wheel, C, while the heads, 11, of the bolts are lodged upon the upper sides of the ribs, 7. For this purpose the upper side of the bar, 1, is milled out, as shown in Figure 1, to a width sufficient to accommodate the heads, 11, of the bolts, 10, but for the sake of strength the milled recesses stop short of the ends of the bar so that the end portions at 12 form bridges which connect the lateral ribs, 13, which form the sides of the milled recesses. As indicated in Figures 1 and 2, these recesses are interrupted by the boss, 5, at the middle of the bar, 1, although the under-cut portion, $2^a$, of the slot 2 extends under the boss. Obviously, since the position of the bolts, 10, is determined by their threaded engagement with the wheel, C, there is no need for friction of their heads with the cross-bar as in the case of the jaw members, 3.

The lower portions, 3ª, of the bases of the members, 3, extend under the guide ribs, 7, of the cross-bar and project toward each other below the overhanging hook portions, 4. As indicated, these projecting parts of the base flanges, 3ª, may be reinforced by connection with the up-standing body portions of the jaws, 3, by means of fillet-like ribs. The forward or inner faces, 3ᵇ, of the jaw members, 3, are tapered slightly away from the perpendicular to the cross bar, 1, to insure clearance for the periphery of the wheel or gear engaged by the hooks, 4, and thus allow the hooks to overhang the gear by their full depth. When the parts are under stress there is a slight tendency for the jaw members, 3, to spring outwardly under the strain applied to the hooks, 4, which makes it important to provide for full engagement of the hooks when they are first applied.

I claim:

1. In combination, a cross-bar having a longitudinal slot open at both ends and unobstructed throughout its length with opposed ribs extending from the side walls of the slot to form an undercut channel in the bar, a pair of pulling fingers with bases laterally grooved for sliding engagement with said ribs, a boss at the middle of the bar disposed opposite the slot but offset from the undercut channel, and pressure exerting means associated with said boss.

2. A gear puller comprising in combination a cross bar having a longitudinal slot open at both ends and unobstructed throughout its length, a threaded boss at the middle of the bar, a jack screw in said boss adapted to extend through the slot, and a pair of pulling fingers having bases formed to extend through the slot with wider portions engageable with the bar above the side walls of said slot.

ROBT. B. HAINSWORTH.